(12) United States Patent
Yamada et al.

(10) Patent No.: US 8,259,394 B2
(45) Date of Patent: Sep. 4, 2012

(54) ANTIREFLECTION STRUCTURE AND OPTICAL DEVICE INCLUDING THE SAME

(75) Inventors: Kazuhiro Yamada, Osaka (JP); Takamasa Tamura, Osaka (JP); Motonobu Yoshikawa, Osaka (JP); Hiroshi Yamaguchi, Osaka (JP); Kazuhiko Ishimaru, Osaka (JP)

(73) Assignee: Panasonic Corporation, Osaka (JP)

( * ) Notice: Subject to any disclaimer, the term of this patent is extended or adjusted under 35 U.S.C. 154(b) by 92 days.

(21) Appl. No.: 13/087,982

(22) Filed: Apr. 15, 2011

(65) Prior Publication Data

US 2011/0188123 A1 Aug. 4, 2011

Related U.S. Application Data

(62) Division of application No. 11/798,536, filed on May 15, 2007, now Pat. No. 7,957,064.

(30) Foreign Application Priority Data

May 15, 2006 (JP) ................................. 2006-134920

(51) Int. Cl.
*G02B 5/18* (2006.01)

(52) U.S. Cl. ...................................................... 359/569

(58) Field of Classification Search .................... 359/596
See application file for complete search history.

(56) References Cited

U.S. PATENT DOCUMENTS

| 6,359,735 | B1 | 3/2002 | Gombert et al. | |
| 7,957,064 | B2 * | 6/2011 | Yamada et al. | 359/577 |
| 2002/0050289 | A1 | 5/2002 | Wada et al. | |
| 2003/0180476 | A1 | 9/2003 | Yamashita et al. | |
| 2004/0140516 | A1 | 7/2004 | Yoshikawa et al. | |
| 2005/0063066 | A1 | 3/2005 | Namioka et al. | |

FOREIGN PATENT DOCUMENTS

| JP | 49-11904 | | 2/1974 |
| JP | 2001-127852 | A | 5/2001 |
| JP | 2001-517319 | A | 10/2001 |
| JP | 2003-114316 | | 4/2003 |
| JP | 2004-012856 | | 1/2004 |
| JP | 2005-031538 | | 2/2005 |
| JP | 2005-234554 | | 9/2005 |
| WO | WO 98/39673 | | 9/1998 |
| WO | WO 2005/116695 | | 12/2005 |

OTHER PUBLICATIONS

Raguin, Daniel H. et al., Analysis of antireflection-structured surfaces with continuous one-dimensional surface profiles, Applied Optics, vol. 32, No. 14, pp. 2582-2598, 1993.

(Continued)

*Primary Examiner* — Derek S Chapel
(74) *Attorney, Agent, or Firm* — McDermott Will & Emery LLP

(57) ABSTRACT

A diffusing plate is formed so as to have a surface having a larger surface roughness than a predetermined wavelength and having an aperiodic roughness shape. A plurality of fine concave/convex portions are formed on the surface so as to be arranged within a cycle equal to and smaller than a predetermined wavelength.

15 Claims, 4 Drawing Sheets

OTHER PUBLICATIONS

D.H. Raguin et al., "Antireflection structured surfaces for the infrared spectral region," Applied Optics, vol. 32, No. 7, Mar. 1, 1993, pp. 1154-1167.

European Search Report issued in European Patent Application No. EP 07 10 8237.4 dated Feb. 9, 2010.

Notice of Allowance issued in U.S. Appl. No. 11/798,536, mailed on Feb. 2, 2011.

Japanese Notice of Reason for Rejection, with Concise explanation in English, issued in Japanese Patent Application No. 2006-134920, dated Mar. 15, 2011.

* cited by examiner

ANTIREFLECTION STRUCTURE AND OPTICAL DEVICE INCLUDING THE SAME

RELATED APPLICATIONS

This application is a Divisional of U.S. patent application Ser. No. 11/798,536, filed on May 15, 2007 now U.S. Pat. No. 7,957,064, claiming priority of Japanese Patent Application No. 2006-134920, filed on May 15, 2006, the entire contents of each of which are hereby incorporated by reference.

BACKGROUND

A technique disclosed herein relates to an antireflection structure and an optical device including the antireflection structure.

DESCRIPTION OF PRIOR ART

In recent years, various kinds of optical devices in which antireflection processing for suppressing reflection of light is performed to a surface have been proposed. As antireflection processing, for example, processing for formation of an antireflection film including a film having a relatively low refractive index (which will be herein referred to as a "low refractive index film"), a multilayer film in which a low refractive index film and a film having a relatively high refractive index (which will be herein referred to as a "high refractive index film") are alternately stacked, or like film has been proposed (for example, see Japanese Laid-Open Publication No. 2001-127852 and the like).

However, for formation of an antireflection film including a low refractive index film or a multilayer film, complex processing such as vapor deposition, sputtering and the like need to be performed. Thus, although productivity is low, production costs become high. Moreover, an antireflection film including a low refractive index film or a multilayer film has high dependency on wavelength and incident angle.

In view of the above-described problems, as antireflection processing relatively less dependent on incident angle and wavelength, for example, processing in which fine concave/convex portions are regularly formed on a surface of an optical device with a pitch equal to or smaller than a wavelength of incident light has been proposed (for example, Daniel H. Raguin and G. Michael Morris, "Analysis of antireflection-structured surfaces with continuous one-dimensional surface profiles", Applied Optics, vol. 32, No. 14, pp. 2582-2598, 1993, and the like). By performing this processing, abrupt change in refractive index in a device interface can be suppressed, so that a refractive index is gradually changed at the device surface. Accordingly, reflection at a surface of an optical device is reduced and a high impingement rate for incident light into the optical device can be achieved.

In National Publication of Translated Version No. 2001-517319, a technique in which fine concave/convex portions are formed on a rough surface is disclosed.

SUMMARY

However, even when fine concave/convex portions are formed on a rough surface, there are cases where the generation of unnecessary light such as reflection light and the like can not be sufficiently suppressed.

The technique disclosed herein has been devised in view of the above-described points and it is therefore an object of such a technique to provide an antireflection structure in which the generation of unnecessary light such as reflection light and the like is sufficiently suppressed.

As a result of keen studies, the present inventors found that when fine concave/convex portions are formed on a rough surface, there are cases where diffracted light is generated and have reached the technique disclosed herein.

Specifically, an antireflection structure according to an aspect of the present disclosure is directed to an antireflection structure for suppressing reflection of light having a wavelength equal to or larger than a predetermined wavelength and is characterized in that the antireflection structure includes a rough surface having a larger surface roughness than the predetermined wavelength and having an aperiodic roughness shape, a plurality of fine concave/convex portions are further formed on the rough surface so as to be arranged within a smaller cycle than the predetermined wavelength, and the rough surface is formed so that a distribution width of cycles standardized with a center cycle of the roughness shape is equal to or larger than 0.4 times as large as the center cycle. Herein, a "predetermined wavelength" means to be a wavelength of light of which reflection is desired to be suppressed, or a wavelength of light of which reflection should be suppressed.

An antireflection structure according to another aspect of the present disclosure is directed to an antireflection structure for suppressing reflection of light having a wavelength equal to or larger than a predetermined wavelength and is characterized in that the antireflection structure includes a rough surface having a larger surface roughness than the predetermined wavelength and having an aperiodic roughness shape, a plurality of fine concave/convex portions are further formed on the rough surface so as to be arranged within a smaller cycle than the predetermined wavelength, a surface roughness of the rough surface in terms of a maximum height roughness Rz defined by ISO4287:1997 is smaller than 100 μm, and the rough surface is formed so that a distribution width of cycles standardized with a center cycle of the roughness shape is equal to or larger than ⅔ times as large as the center cycle.

An optical device according to an aspect of the present disclosure is characterized by including the antireflection structure of the technique disclosed herein.

Accordingly, an antireflection structure in which the generation of unnecessary light such as reflection light and the like can be sufficiently suppressed.

DESCRIPTION OF THE PREFERRED EMBODIMENTS

Hereafter, embodiments will be described with reference to the accompanying drawings. Herein, using a diffusing plate implemented in accordance with the present invention as an example, an embodiment of an antireflection structure according to the present invention will be described. However, the antireflection structure according to the present invention is not limited to the following embodiments but may be applied to, for example, some other optical device such as a semiconductor laser device, a LED device, an electric bulb, a cold-cathode tube and the like, an image sensor such as a charge-coupled device (CCD), a CMOS and the like, an optical detector such as a power meter, an energy meter, a reflection coefficient measuring device and the like, a microlens array, a photo disc and the like.

Figure 1:
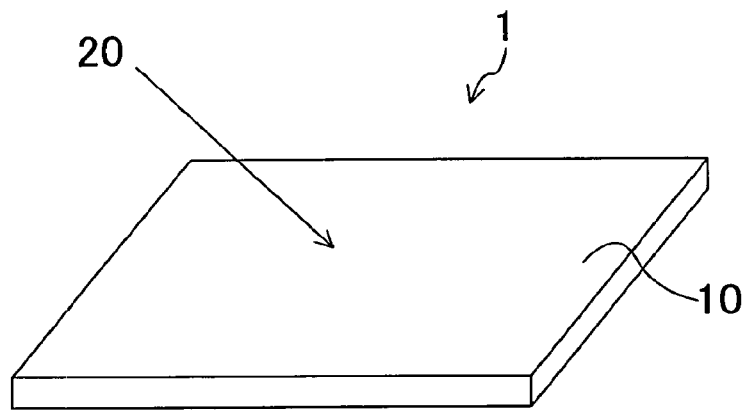
FIG. 1 is a schematic view of a diffusing plate 1.

FIG. 1 is a schematic view of a diffusing plate 1 according to this embodiment.

Figure 2:
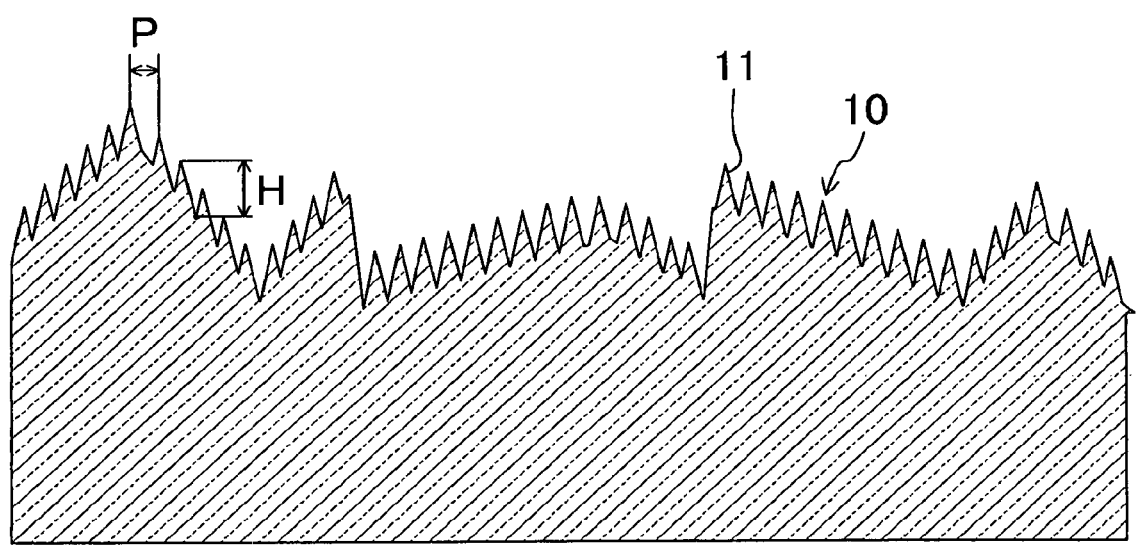
FIG. 2 is a cross-sectional view of part of the diffusing plate 1.

FIG. 2 is a cross-sectional view of part of the diffusing plate 1.

The diffusing plate 1 according to the technique disclosed herein is a face material having an approximately rectangular shape when viewed from the top. The diffusing plate 1 diffuses light and transmits diffused light (more specifically, at least diffuses and transmits light of which reflection is suppressed by fine concave/convex portions 11 which will be described later). For example, the diffusing plate 1 is placed on a front of a display and the like and suppresses reflection of light (glare caused by extraneous light) at a display surface. Note that a material of the diffusing plate 1 is not particularly limited but the diffusing plate 1 may be formed of resin or glass. Also, particles and the like may be dispersedly mixed in the material.

Figure 3:
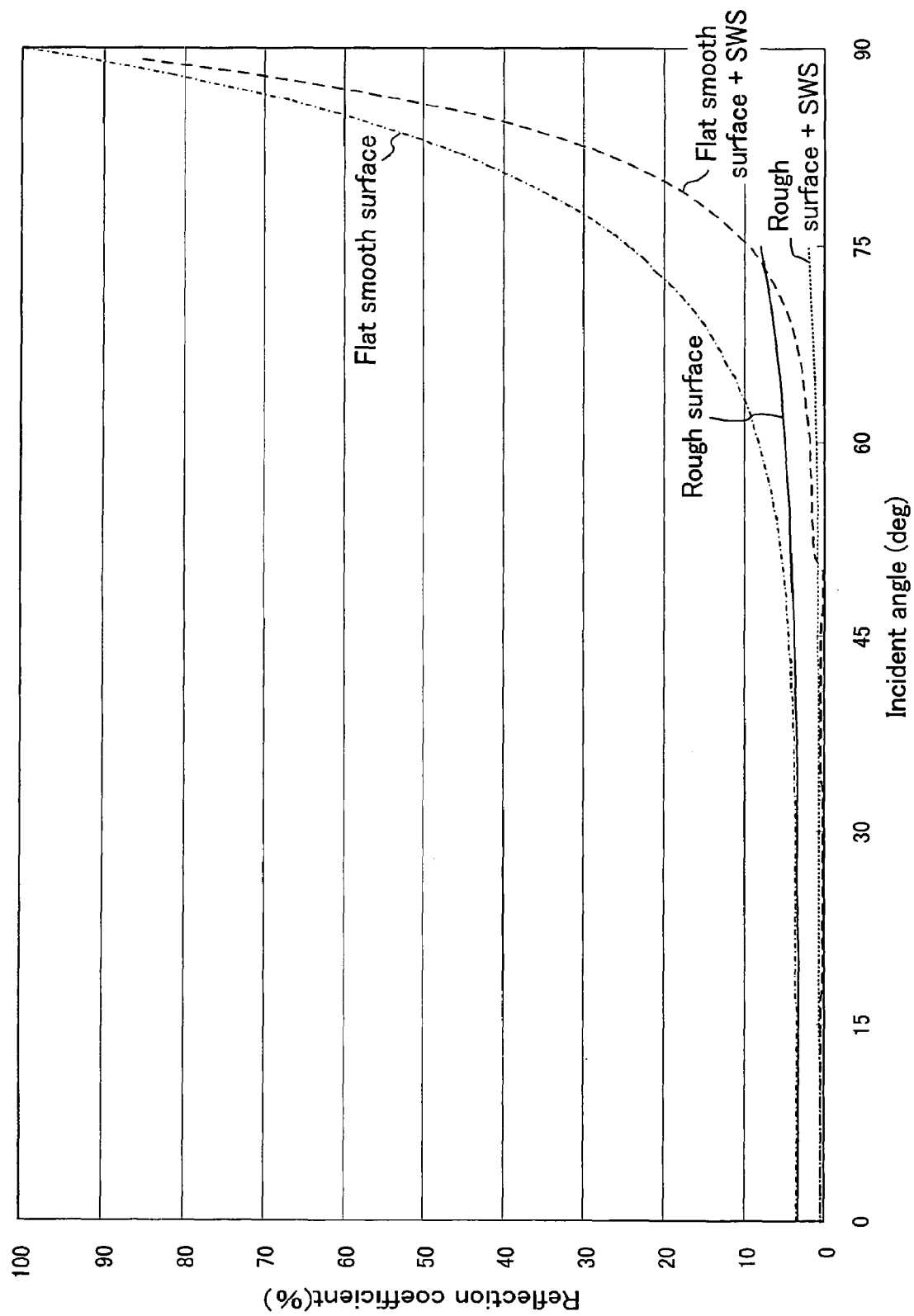
FIG. 3 is a graph showing the correlation between incident angle and reflection coefficient.

In this embodiment, as shown in FIG. 2, a plurality of fine concave/convex portions 11 are formed on a surface 10 of the diffusing plate 1 so as to be regularly arranged within a cycle equal to or smaller than a wavelength of incident light 20 (the cycle of the fine concave/convex portions 11 is preferably equal to or smaller than a smallest wavelength of incident light). (Hereafter, an antireflection structure in which the plurality of fine concave/convex portions 11 are formed will be occasionally referred to as "SWS".) Thus, abrupt change in refractive index between the surface 10 of the diffusing plate 1 and an air layer can be suppressed, so that a refraction index is gradually changed in a surface layer portion of the surface 10 including the fine concave/convex portions 11. Thus, as shown in FIG. 3, with the fine concave/convex portions 11 formed in the surface 10, reflection at the surface 10 of the diffusing plate 1 can be effectively suppressed.

As long as the fine concave/convex portions 11 have the function of moderating change in refractive index at an interface between the surface 10 and the air layer, a shape of each of the fine concave/convex portions 11 is not particularly limited. For example, each of the fine concave/convex portions 11 may be an approximately conical concave or convex (of which a top portion may be chamfered or R-chamfered), a prismoid concave or convex or a filiform concave or a filiform convex of which a cross-sectional shape is triangular, trapezoidal, rectangular or the like (of which edge portions may be R-chamfered).

In view of realizing high antireflection effect, a cycle (i.e., a distance between top points of adjacent ones of the fine concave/convex portions 11 when viewed from the top in the normal direction of a reference plane of the surface 10 formed to be a rough surface) of the fine concave/convex portions 11 is preferably equal to or smaller than a wavelength of incident light 20. Herein, a "reference plane" means to be a plane obtained by cutting off the fine concave/convex portions 11 and a roughness shape as high-frequency components. A height (strictly speaking, defined to be a distance from the reference plane of the surface 10, which is formed to be a rough surface, in the normal direction of the reference plane) of each of the fine concave/convex portions 11 is preferably equal to or larger than 0.4 times as large as a wavelength of the incident light 20, more preferably equal to or larger than the wavelength, and even more preferably equal to or larger than three times as large as the wavelength. Strictly speaking, as in this embodiment, assume that the incident light 20 has a wavelength width. The cycle of the fine concave/convex portions 11 is preferably equal to or smaller than a smallest wavelength of incident light and the height of each of the fine concave/convex portions 11 is preferably equal to or larger than 0.4 times as large as the largest wavelength of the incident light 10 (more preferably the same as the largest wavelength and even more preferably equal to or larger than three times as large as the largest wavelength).

The fine concave/convex portions 11 do not have to exhibit antireflection effect for all the incident light 20. For example, when a wavelength of the incident light 20 is in a wide wavelength range including ultraviolet light, near-ultraviolet light, visible light, near-infrared light and infrared light but only reflection of light having a wavelength of 400 nm or more and to 700 nm or less needs to be suppressed, the cycle of the fine concave/convex portions 11 is preferably equal to or smaller than 400 nm. The height of each of the fine concave/convex portions 11 is preferably equal to or larger 0.4 times as large as 700 nm, i.e., 280 nm or more.

The fine concave/convex portions 11 may be formed so that the height of the fine concave/convex portions 11 differs between different parts (for example, each having a size of 1 mm squares) of the surface 10. However, in view of simplification of formation, the fine concave/convex portions 11 are preferably formed so that respective heights of the fine concave/convex portions 11 in the different parts are approximately the same. When the fine concave/convex portions 11 include conical/pyramidal concaves and conical/pyramid convexes, the fine concave/convex portions 11 are preferably formed so that a central axis of each of cones or pyramids, connecting a center point of a base and a top point of each of the cones or the pyramids, is approximately in parallel to central axises of other cones or pyramids. In this case, fabrication of the diffusing plate 1 by injection molding is simple. For the same reason, when the fine concave/convex portions 11 include filiform concaves and filiform convexes each having a triangular cross section, the plurality of the fine concave/convex portions 11 are preferably formed so that a center axis of each of filiform portions, connecting respective center points of a top and a base of each of the filiform portions, is approximately in parallel to center axises of other filiform portions in each part (for example, having a size of 1 mm squares) of the surface 10.

As has been described, the plurality of fine concave/convex portions 11 are formed at the surface 10, so that reflection of light at the surface 10 can be suppressed. However, when the surface 10 is a smooth surface, regular reflection at the surface 10 can not be sufficiently suppressed.

Figure 4:
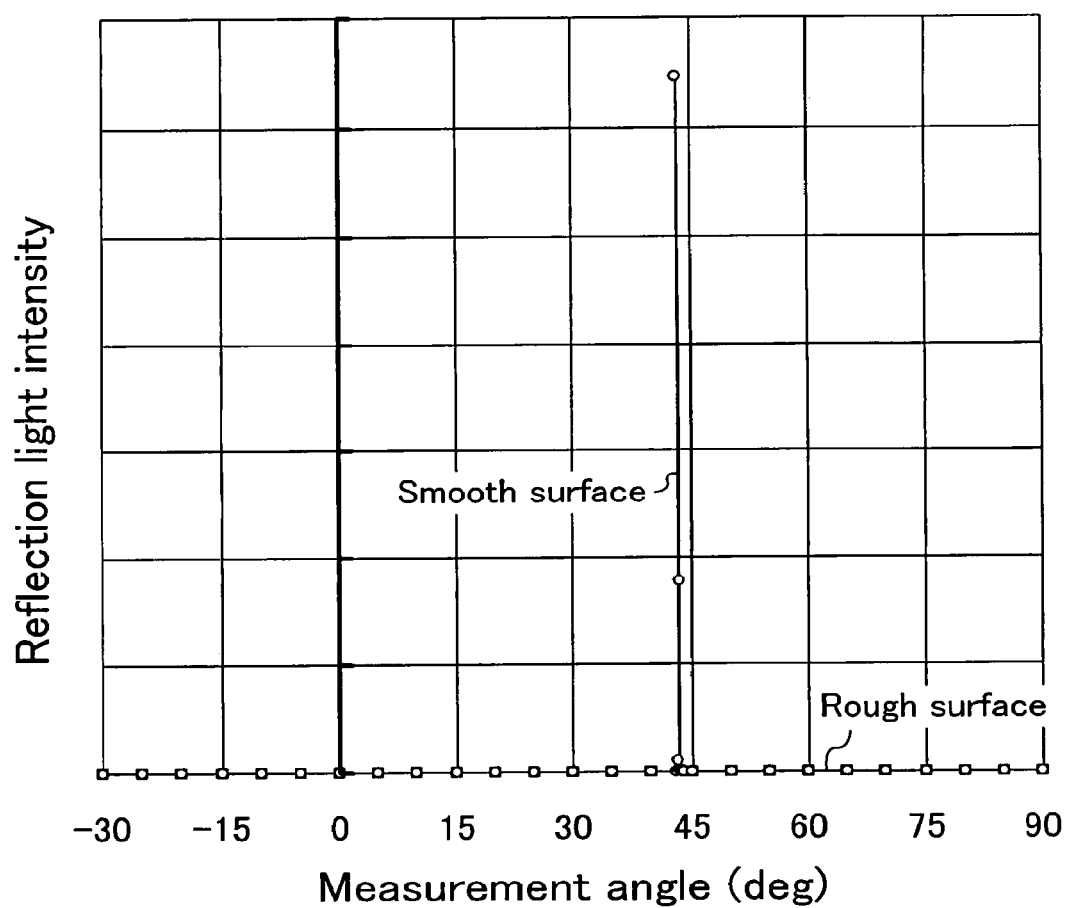
FIG. 4 is a graph showing reflection light intensity of incident light at an incident angle of 45 degrees.

FIG. 4 is a graph showing reflection light intensity of incident light at an incident angle of 45 degrees.

As shown in FIG. 4, when the fine concave/convex portions 11 are formed on a smooth surface, reflection light at an output angle of about 45 degrees, i.e., regular reflection is observed. In this manner, when the surface 10 in which the fine concave/convex portions 11 are formed is a smooth surface, regular reflection of the incident light 20 can not be sufficiently suppressed. In contrast, as shown in FIG. 4, when the fine concave/convex portions 11 are formed on a rough surface having a larger surface roughness than a wavelength of incident light, regular reflection is substantially not observed. In this embodiment, as shown in FIG. 2, the surface 10 is formed so as to be a rough surface having a larger surface roughness than a wavelength of incident light. More specifically, the surface 10 is formed so that a surface roughness in terms of maximum height roughness Rz defined in ISO4287: 1997 (JIS B0601: 2001) is larger than a wavelength of the incident light 20. Thus, in the diffusing plate 1 of this embodiment, regular reflection at the surface 10 can be sufficiently suppressed. Note that the effect of suppressing the generation of regular reflection tends to be reduced when the surface roughness of the surface 10 is too large. A preferable range of the surface roughness Rz of the surface 10 is 100 μm or less. The surface roughness Rz is more preferably 50 μm and even more preferably 30 μm.

As shown in FIG. 3, when the fine concave/convex portions 11 (SWS) are formed on a smooth surface, a sufficient antireflection effect for light at a relatively large incident angle can not be achieved. That is, reflection coefficient is dependent on incident angle. In contrast, as in this embodiment, the fine concave/convex portions 11 (SWS) are formed on the surface 10 which is a rough surface, so that, as shown in FIG. 3, a sufficient antireflection effect for light at a relatively large incident angle can be also achieved. That is, according to this embodiment, the dependency of reflection coefficient on incident angle can be reduced and reflection of light at a relatively large incident angle can be effectively suppressed.

As has been described above, with the surface 10 formed so as to be a predetermined rough surface, reflection of the incident light 20 at a relatively large incident angle as well as regular reflection can be effectively suppressed. When a roughness shape of the surface 10 has a predetermined periodic structure, diffracted light might be generated. In this embodiment, the surface 10 is formed so as to have an aperiodic roughness shape. Thus, with the diffusing plate 1 of this embodiment, not only reflection can be effectively suppressed but also the generation of diffracted light can be effectively suppressed, so that the generation of unnecessary light such as reflection light, diffracted light and the like can be effectively suppressed. Herein, a roughness shape means to be a shape obtained by cutting off the fine concave/convex portions 11 as high-frequency components from a shape of the surface 10 including the fine concave/convex portions 11 (hereafter, the shape of the surface 10 including the fine concave/convex portions 11 will be referred to as merely a "shape of the inner circumference surface 10").

Figure 5:
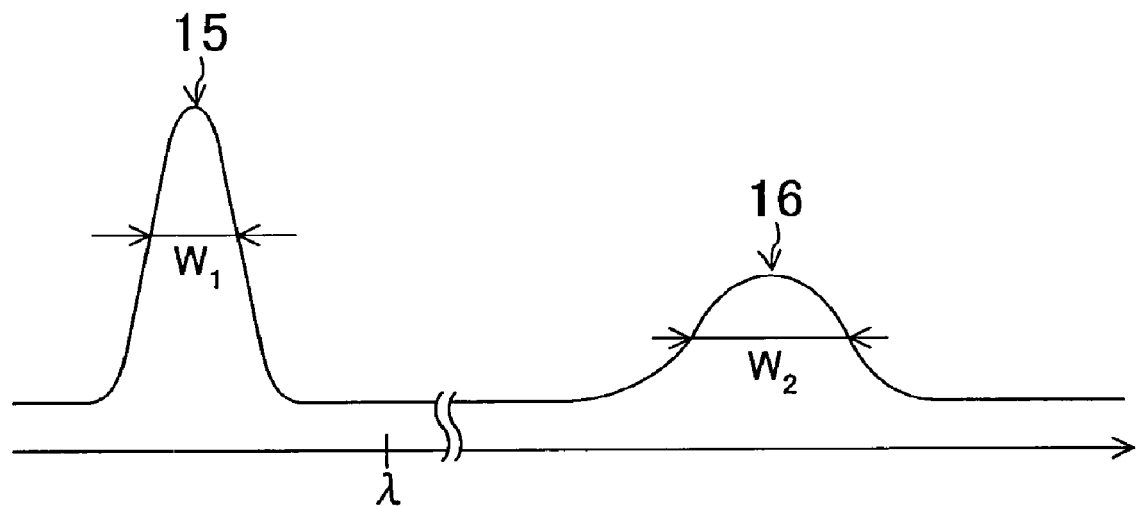
FIG. 5 is an illustration of a spectrum obtained by Fourier-transforming a height distribution in the normal direction of a reference plane of a shape of the surface 10.

In view of effectively suppressing the generation of diffracted light, as shown in FIG. 5, in a spectrum obtained by Fourier-transforming a height distribution in the normal direction of the reference plane of the surface 10, a peak width (for example, a width of a peak at a half of a height of the peak) $W_2$ of a peak 16 for the roughness shape of the surface 10 is preferably larger than a peak width $W_1$ of a peak 15 for the fine concave/convex portions 11.

In view of further reducing the generation of uneven diffracted light, the surface 10 is preferably formed so that a distribution width of cycles standardized with a center cycle (which is most frequently included in the surface 10) of the surface 10 is equal to or larger than 0.4 times as large as the center cycle. If the distribution width of the cycles standardized with the center cycle is smaller than 0.4 times as large as the center cycle, in the surface 10, part of a diffraction angle in which a second-order diffracted light exists and another part of a diffraction angle in which a third-order diffracted light exists are isolated from each other, so that unevenness in the generated diffracted light might be generated. On the other hand, if the distribution width of the cycles standardized with the center cycle is equal to or larger than 0.4 times as large as the center cycle, in the surface 10, part of a diffraction angle in which the second-order diffracted light is generated and another part of a diffraction angle in which the third-order diffracted light is generated are partially superimposed with each other, so that unevenness in diffracted light can be reduced.

Particularly, the distribution width of the cycles standardized with the center cycle of the roughness shape of the surface 10 is preferably equal to or larger than ⅔ times as large as the center cycle. With this configuration, not only part of a diffraction angle in which the second-order diffracted light is generated and another part of a diffraction angle in which the third-order diffracted light is generated are partially superimposed with each other but also part of a diffraction angle in which a first-order diffracted light is generated and another part of a diffraction angle in which the second-order diffracted light is generated are partially superimposed with each other, so that unevenness in diffracted light due to the absence of part of a diffraction angle in which neither the first-order diffracted light nor the second-order diffracted light exist can be reduced.

Figure 6:
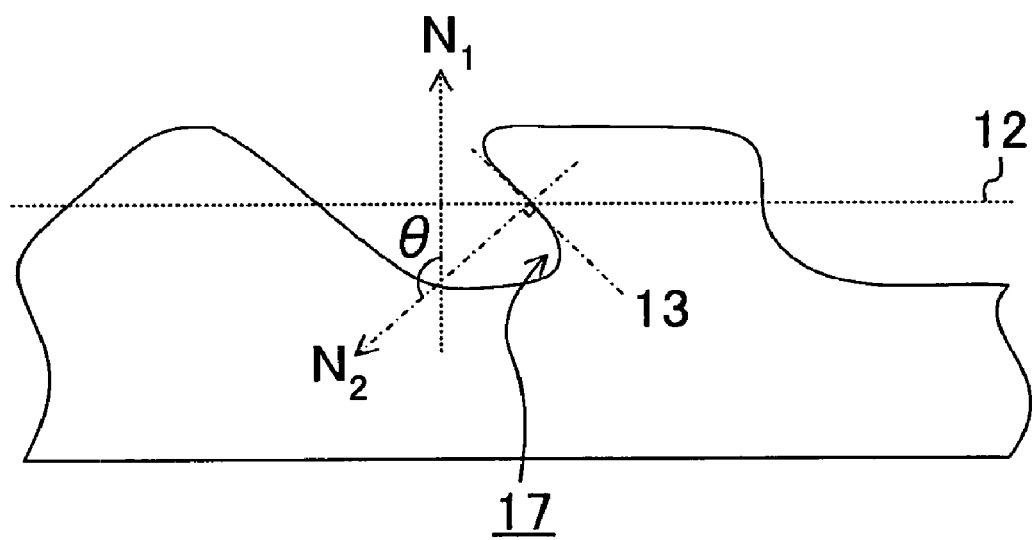
FIG. 6 is a cross-sectional view illustrating the case where θ is larger than 90 degrees.

In view of fabrication, as shown in FIG. 6, it is preferable that part in which an angle (θ) between a normal vector $N_2$ of a tangent plane 13 of a surface roughness shape of the surface 10 and a normal vector $N_1$ of a reference plane 12 of the surface 10 does not exist. In other words, it is preferable that the surface 10 is substantially formed of a plane having a roughness shape of θ≦90 degrees. This is because, as shown in FIG. 6, when the part in which θ is larger than 90 degrees exists, it is difficult to form the fine concave/convex portions 11 on part of the surface 10 facing to a depression portion 17.

In this embodiment, the antireflection structure of the present invention has been described using the light transmitting diffusing plate 1 as an example. However, the antireflection structure of the present invention is not limited to a light transmitting structure but may be, for example, a light absorbing structure, i.e., a so-called black body.

Moreover, in this embodiment, an example where the SWS is formed directly on the surface 10 of the diffusing plate 1 has been described. However, a seal in which the SWS is formed may be adhered or cohered onto a flat smooth surface to form the surface 10. In other words, the diffusing plate 1 does not have to be a single unit body, but may be formed of a plurality of components.

In this embodiment, an example where the SWS is formed throughout the surface 10 has been described. However, the SWS does not have to be provided throughout the surface 10, but may be formed only in necessary part. In such case, as well as the part in which the SWS is provided, other part of the surface 10 may be a rough surface having the same surface roughness as the surface roughness of the part in which the SWS is provided or may be a smooth surface having a smaller surface roughness than the surface roughness of the part in which the SWS is provided. Furthermore, some other antireflection structure including a multilayer film of a film having a relatively low reflection coefficient and a film having a relatively large reflection coefficient may be formed in part in which the SWS is not formed. Moreover, even in the part in which the SWS is formed, a height and a cycle (pitch) of the SWS may be adjusted as necessary.

The present invention is not limited to the above-described embodiment and various modifications are possible without departing from the spirit and material features of the present invention. The above-described embodiment is merely an example in all aspects and its interpretation is not to be limited. The scope of the present invention is indicated by the scope of claims and not limited by the specification. Furthermore, all changes and modifications belonging to the scope of equivalents of the claims fall within the scope of the present invention.

What is claimed is:

1. An antireflection structure for suppressing reflection of light having a wavelength equal to or larger than a predetermined wavelength, the antireflection structure comprising:
   a rough surface having a larger surface roughness than the predetermined wavelength and having an aperiodic roughness shape,
   wherein a plurality of fine concave/convex portions are further formed on the rough surface so as to be arranged within a smaller cycle than the predetermined wavelength,
   wherein the rough surface is formed so that a distribution width of cycles standardized with a center cycle of the roughness shape is equal to or larger than 0.4 times as large as the center cycle, and
   wherein the predetermined wavelength is 400 nm or more and 700 nm or less.

2. The antireflection structure of claim 1, wherein the rough surface is formed so that a distribution width of cycles standardized with a center cycle of the roughness shape is equal to or larger than ⅔ times as large as the center cycle.

3. The antireflection structure of claim 1, wherein a height distribution in a normal direction of a reference plane of the rough surface of the light absorbing antireflection structure presents a peak for a roughness shape of the rough surface having a larger width than a width of a peak for the fine concave/convex portions in the spectrum in a spatial frequency domain.

4. The antireflection structure of claim 1, wherein the antireflection structure transmits the light of which reflection is suppressed.

5. The antireflection structure of claim 1, wherein the fine concave/convex portions are approximately conical/pyramidal concaves and convexes, or filiform concaves and convexes.

6. The antireflection structure of claim 1, wherein a surface roughness of the rough surface in terms of a maximum height roughness Rz defined by ISO4287:1997 is larger than the predetermined wavelength.

7. The antireflection structure of claim 1, wherein a surface roughness of the rough surface in terms of a maximum height roughness Rz defined by ISO4287:1997 is smaller than 100 µm.

8. The antireflection structure of claim 1, wherein a surface roughness of the rough surface in terms of a maximum height roughness Rz defined by ISO4287:1997 is smaller than 50 µm.

9. The antireflection structure of claim 1, wherein a surface roughness of the rough surface in terms of a maximum height roughness Rz defined by ISO4287:1997 is smaller than 30 µm.

10. The antireflection structure of claim 1, wherein respective heights of the plurality of fine concave/convex portions from the rough surface in a normal direction of a reference plane of the rough surface are approximately the same.

11. The antireflection structure of claim 1, wherein the rough surface is substantially formed of a plane in which an angle between a normal vector of a tangent plane of a roughness shape and a normal vector of a reference plane of the rough surface is 90 degrees or less.

12. The antireflection structure of claim 1, wherein each of the plurality of fine concave/convex portions is a conical/pyramidal concave or convex and respective center axises of the plurality of fine concave/convex portions are parallel to each other, each of the center axises connecting a center of a base and a top point of each of the concave/convex portions.

13. The antireflection structure of claim 1, wherein each of the plurality of fine concave/convex portions has a height equal to or larger than 0.4 times as large as a wavelength of light of which reflection is suppressed.

14. An optical device comprising the antireflection structure of claim 1.

15. An antireflection structure for suppressing reflection of light having a wavelength equal to or larger than a predetermined wavelength, the antireflection structure comprising:
   a rough surface having a larger surface roughness than the predetermined wavelength and having an aperiodic roughness shape,
   wherein a plurality of fine concave/convex portions are further formed on the rough surface so as to be arranged within a smaller cycle than the predetermined wavelength, wherein a surface roughness of the rough surface in terms of a maximum height roughness Rz defined by ISO4287:1997 is smaller than 100 µm,
   wherein the rough surface is formed so that a distribution width of cycles standardized with a center cycle of the roughness shape is equal to or larger than ⅔ times as large as the center cycle, and
   wherein the predetermined wavelength is 400 nm or more and 700 nm or less.

* * * * *